United States Patent
Xu

(10) Patent No.: US 11,304,159 B2
(45) Date of Patent: Apr. 12, 2022

(54) SIGNAL TRANSMISSION METHOD AND APPARATUS AND COMPUTER STORAGE MEDIUM

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/203,573

(22) Filed: Mar. 16, 2021

(65) Prior Publication Data

US 2021/0204234 A1  Jul. 1, 2021

Related U.S. Application Data

(63) Continuation of application No. PCT/CN2018/106218, filed on Sep. 18, 2018.

(51) Int. Cl.
*H04W 56/00* (2009.01)
*H04L 27/26* (2006.01)

(52) U.S. Cl.
CPC ..... *H04W 56/001* (2013.01); *H04L 27/26025* (2021.01); *H04W 56/0065* (2013.01)

(58) Field of Classification Search
CPC ..... H04L 5/0048–0051; H04L 27/2655; H04L 27/2657; H04L 27/2662; H04L 27/2675; H04W 56/001–0015
See application file for complete search history.

(56) References Cited

U.S. PATENT DOCUMENTS

| | | | |
|---|---|---|---|
| 2018/0227866 A1 | 8/2018 | Jung et al. | |
| 2019/0081843 A1* | 3/2019 | Vaze | H04L 27/2666 |
| 2019/0254026 A1* | 8/2019 | Liu | H04L 5/0048 |
| 2021/0022015 A1* | 1/2021 | Oh | H04W 16/28 |
| 2021/0084605 A1* | 3/2021 | Wu | H04L 5/0053 |
| 2021/0112552 A1* | 4/2021 | Tiirola | H04L 5/0064 |

FOREIGN PATENT DOCUMENTS

| | | |
|---|---|---|
| CN | 106455040 A | 2/2017 |
| CN | 106507439 A | 3/2017 |
| CN | 106603213 A | 4/2017 |

(Continued)

OTHER PUBLICATIONS

International Search Report in the international application No. PCT/CN2018/106218, dated Apr. 28, 2019.

(Continued)

*Primary Examiner* — Marcus Smith
(74) *Attorney, Agent, or Firm* — Perkins Coie LLP

(57) ABSTRACT

A signal transmission method and apparatus and a computer storage medium are provided. The method is implemented by a terminal device and includes: determining a transmission time set of Synchronization Signal Block (SSB), the transmission time set being determined according to at least one of: a length of a time window, a Subcarrier Spacing (SCS) of the SSB and the amount of the SSB (S501); and receiving the SSB from a network device based on the transmission time set (S502).

16 Claims, 4 Drawing Sheets

(56) References Cited

FOREIGN PATENT DOCUMENTS

| | | | |
|---|---|---|---|
| CN | 107295542 A | 10/2017 |
| CN | 107528682 A | 12/2017 |
| CN | 107567698 A | 1/2018 |
| CN | 108270710 A | 7/2018 |
| CN | 108282317 A | 7/2018 |
| CN | 108282859 A | 7/2018 |
| CN | 108390747 A | 8/2018 |
| RU | 2460226 C2 | 8/2012 |
| WO | 2016106680 A1 | 7/2016 |
| WO | 2018000440 A1 | 1/2018 |
| WO | 2018075985 A1 | 4/2018 |

OTHER PUBLICATIONS

3GPP TSG-RAN WG4#86 R4-1802391, Athens, Greece, Feb. 26-Mar. 2, 2018, Source: Nokia, Nokia Shanghai Bell, Title: SMTC and measurement gap timing for EN-DC, Agenda Item: 7.9.3.1, Document for: Discussion. 4 pages.
3GPP TSG RAN WG1 Meeting #94 R1-1809219, Gothenburg, Sweden, Aug. 20-24, 2018, Agenda Item: 7.2.2.4.2, Source: Xiaomi, Title: Initial Access in NR unlicensed, Document for: Discussion and Decision. 6 pages.
Supplementary European Search Report in the European application No. 18934022.7, dated Jul. 22, 2021. 6 pages.
First Office Action of the Chinese application No. 202010706474.3, dated Aug. 9, 2021. 20 pages with English translation.
First Office Action of the Indian application No. 202117014314, dated Feb. 7, 2022. 8 pages with English translation.
First Office Action of the Russian application No. 2021110387, dated Dec. 16, 2021. 11 pages with English translation.

* cited by examiner

SIGNAL TRANSMISSION METHOD AND APPARATUS AND COMPUTER STORAGE MEDIUM

REFERENCE TO RELATED APPLICATION

This application is a continuation of International Patent Application No. PCT/CN2018/106218 filed on Sep. 18, 2018, the content of which is incorporated herein by reference in its entirety.

TECHNICAL FIELD

Embodiments of the disclosure relate to the technical field of mobile communication, and particularly to a method and apparatus for signal transmission and a computer storage medium.

BACKGROUND

Unlicensed spectrums are spectrums divided by countries and districts and available for radio device communication. The spectrums may usually be considered as shared spectrums, namely communication devices in different communication systems can use the spectrums without applying to the governments for dedicated spectrum grants when meeting regulatory requirements of the countries or the districts on the spectrums.

Along with the development of wireless communication technologies, in a 5th-Generation (5g) New Radio (NR) technology for transmission of Synchronization Signal Block (SSB), the SSB cannot be successfully transmitted at SSB transmission time defined in a conventional NR technology.

SUMMARY

In view of this, the embodiments of the disclosure are expected to provide a method and apparatus for signal transmission and a computer storage medium. Transmission opportunities of SSB can be increased as much as possible to ensure successful transmission of the SSB. In addition, increase of the transmission opportunities may be determined according to a length of a time window, a Subcarrier Spacing (SCS) of the SSB and the amount of the SSB, so that the impact on measurement of a terminal can also be reduced.

The technical solutions of the embodiments of the disclosure may be implemented as follows.

According to a first aspect, the embodiments of the disclosure provide a signal transmission method, which may be implemented by a terminal device and include that:

a transmission time set of SSB is determined, the transmission time set being determined according to at least one of a length of a time window, an SCS of the SSB and the amount of the SSB; and the SSB transmitted by a network device is received based on the transmission time set.

According to a second aspect, the embodiments of the disclosure provide a signal transmission method, which may be implemented by a network device and include that:

a transmission time set of SSB is determined, the transmission time set being determined according to at least one of a length of a time window, an SCS of the SSB and the amount of the SSB; and the SSB is transmitted to a terminal device based on the transmission time set.

According to a third aspect, the embodiments of the disclosure provide a terminal device, which may include a first processing unit and a first communication unit.

The first processing unit may be configured to determine a transmission time set of SSB, the transmission time set being determined according to at least one of a length of a time window, an SCS of the SSB and the amount of the SSB.

The first communication unit may be configured to receive the SSB from a network device based on the transmission time set.

According to a fourth aspect, the embodiments of the disclosure provide a network device, which may include a second processing unit and a second communication unit.

The second processing unit may be configured to determine a transmission time set of SSB, the transmission time set being determined according to at least one of a length of a time window, an SCS of the SSB and the amount of the SSB.

The second communication unit may be configured to send the SSB to a terminal device based on the transmission time set.

According to a fifth aspect, the embodiments of the disclosure provide a terminal device, which may include a first memory and a first processor.

The first memory may be configured to store a computer program capable of running in the first processor.

The first processor may be configured to run the computer program to implement the operations of the method of the first aspect.

According to a sixth aspect, the embodiments of the disclosure provide a network device, which may include a second memory and a second processor.

The second memory may be configured to store a computer program capable of running in the second processor.

The second processor may be configured to run the computer program to implement the operations of the method of the second aspect.

According to a seventh aspect, the embodiments of the disclosure provide a computer storage medium, which may store a signal transmission program, the signal transmission program being executed by at least one processor to implement the operations of the method of the first aspect or the second aspect.

The embodiments of the disclosure provide the signal transmission method and apparatus and the computer storage medium. The method implemented by the terminal device includes that: a transmission time set of the SSB is determined, the transmission time set being determined according to at least one of: the length of a time window, the SCS of SSB and the amount of the SSB; and the SSB transmitted by the network device is received based on the transmission time set. Transmission opportunities of SSB can be increased as much as possible to ensure successful transmission of the SSB. In addition, increase of the transmission opportunities may be determined according to the length of a time window, the SCS of SSB and the amount of the SSB, so that the impact on measurement of a terminal can also be reduced.

DETAILED DESCRIPTION

Figure 1:
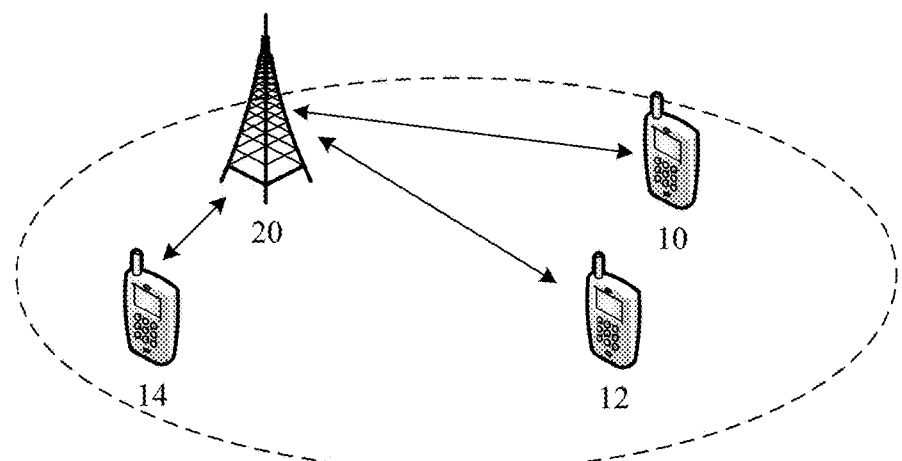
FIG. 1 is an architecture diagram of a communication system according to an embodiment of the disclosure.

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

In subsequent descriptions, suffixes configured to represent components, like "module", "part" or "unit", are adopted only for convenient description about the technical solutions of the embodiments of the disclosure, and they do not have any specific meaning. Therefore, "module", "part" or "unit" may be mixed for use.

It is to be noted that the technical solutions of the embodiments of the disclosure may be implemented by various communication systems, for example, a Global System of Mobile communication (GSM), a Code Division Multiple Access (CDMA) system, a Wideband Code Division Multiple Access (WCDMA) system, a General Packet Radio Service (GPRS), a Universal Mobile Telecommunication System (UMTS), a Long Term Evolution (LTE) system as well as an evolved system of the LTE system such as an Advanced LTE (LTE-A) system, an NR system as well as an evolved system of the NR system such as an NR-based access to Unlicensed spectrum (NR-U) system, or a next-generation communication system.

In addition, the technical solutions of the embodiments of the disclosure may also be applied to Device to Device (D2D) communication, Machine to Machine (M2M) communication, Machine Type Communication (MTC) and Vehicle to Vehicle (V2V) communication.

It can be understood that the above-mentioned communication system may be applied to a licensed spectrum or may also be applied to an unlicensed spectrum, for example, a 2.4 GHz, 5 GHz, 37 GHz or 60 GHz spectrum.

The communication system in the embodiments of the disclosure may be applied to a Carrier Aggregation (CA) scenario, or may also be applied to a Dual Connectivity (DC) scenario, or may be applied to a Standalone (SA) network deployment scenario.

When the communication system in the embodiments of the disclosure is applied to an unlicensed spectrum and a network deployment scenario is CA, the CA network deployment scenario may be that a primary carrier is in a licensed spectrum, a secondary carrier is in an unlicensed spectrum and the primary carrier is connected with the secondary carrier through an ideal backhaul.

When the communication system in the embodiments of the disclosure is applied to an unlicensed spectrum and the network deployment scenario is DC, the DC network deployment scenario may be that a primary carrier is in a licensed spectrum, a secondary carrier is in an unlicensed spectrum and the primary carrier is connected with the secondary carrier through a non-ideal backhaul. A system on the primary carrier and a system on the secondary carrier may be different systems, for example, the system on the primary carrier is an LTE system, and the system on the secondary carrier is an NR system. Or, the system on the primary carrier and the system on the secondary carrier may also be the same system, for example, both the systems on the primary carrier and the secondary carrier are LTE systems or NR systems.

When the communication system in the embodiments of the application is applied to an unlicensed spectrum and the network deployment scenario is SA, a terminal device may access a network through a system on the unlicensed spectrum.

In general, referring to FIG. 1, a structure diagram of a communication system 1 as an atypical example is shown. The communication system may include terminal devices 10, 12 and 14 and a network device 20, and the terminal devices are communicated with the network device through radio links respectively, as shown by the double sided arrows. In FIG. 1, the terminal devices 10, 12 and 14 may also be called User Equipment (UE), an access terminal, a user unit, a user Station (ST), a mobile radio ST, a mobile ST, a remote ST, a remote terminal, a mobile device, a user terminal, a terminal, a wireless communication device, a user agent or a user device. The terminal device may be an ST in a Wireless Local Area Network (WLAN), and may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, a vehicle device, a wearable device, a terminal device in a next-generation communication system, for example, a future 5G network, a terminal device in a future evolved Public Land Mobile Network (PLMN) or the like. In the embodiments of the disclosure, the terminals device may also be wearable devices. The wearable device may also be called a wearable intelligent device and is a generic term of wearable devices obtained by performing intelligent designing and development on daily wearing products, for example, glasses, gloves, watches, clothes and shoes.

The network device 20 may be a device configured to communicate with the terminal devices, and the network device may be an Access Point (AP) in the WLAN, a Base Transceiver Station (BTS) in a GSM or CDMA, or may also be a NodeB (NB) in WCDMA, or may be an Evolutional Node B (eNB or eNodeB) in LTE, or a relay station or AP, or a vehicle device, a wearable device, a network device such as a 5G base ST (gNB) in an NR network, a network device in the future evolved PLMN or the like.

In the embodiments of the disclosure, the network device 20 may provide service for a cell, and the terminal devices 10, 12 and 14 can communicate with the network device 20 through a transmission resource (for example, a frequency-domain resource or a spectrum resource) for the cell. The cell may be a cell corresponding to the network device 20 (for example, a base ST), and the cell may belong to a macro base ST or may belong to a base ST corresponding to a small cell. Here, the small cell may include: a metro cell, a micro cell, a pico cell, a femto cell and the like. These small cells have the characteristics of small coverage and low transmitted power and are applied to provision of high-rate data transmission service.

In the embodiments of the disclosure, multiple cells can simultaneously work on the same frequency in a carrier in an LTE system or an NR system. In some special scenarios, concepts of carrier and cell may also be considered to be equivalent. For example, in a CA scenario, when a secondary carrier is configured for UE, both a carrier index of the secondary carrier and a cell Identity (ID) of a secondary cell working on the secondary carrier can be contained. Under this condition, the concepts of carrier and cell may be considered to be equivalent. For example, for UE, access to a carrier and access to a cell are equivalent.

Based on the communication system as shown in FIG. 1, in the embodiments of the disclosure, a shared channel and signal in an NR system, for example, a Synchronization Signal (SS) and a Physical Broadcast Channel (PBCH), needs to cover a whole cell in a multi-beam scanning manner so that UE in the cell can receive the channel and signal. Multi-beam transmission of a SS may be implemented by defining an SS/PBCH burst set. An SS/PBCH burst set may include one or more SS/PBCH blocks, and an SS/PBCH block is configured to bear an SS and PBCH of a beam. Therefore, an SS/PBCH burst set may include SSs of N beams corresponding to SS/PBCH blocks in a cell. The maximum number L of the SS/PBCH blocks is related to a band of the system. For example, when the band of the system does not exceed 3 GHz, the maximum number L of the SS/PBCH blocks is valued to be 4; when the band of the system ranges from 3 GHz to 6 GHz, the maximum number L of the SS/PBCH blocks is valued to be 8; and when the band of the system ranges from 6 GHz to 52.6 GHz, the maximum number L of the SS/PBCH blocks is valued to be 64.

Figure 2:
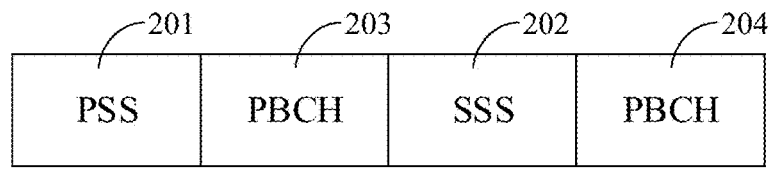
FIG. 2 is a composition structure diagram of SSB according to an embodiment of the disclosure.

Referring to FIG. 2, a composition structure diagram of SSB according to an embodiment of the disclosure is shown. As shown in FIG. 2, SSB includes a Primary Synchronization Signal (PSS) 201, a Secondary Synchronization Signal (SSS) 202 and two New Radio Access Technology-based Physical Broadcast Channels (NR-PBCHs), the two NR-PBCHs being PBCH 203 and PBCH 204 respectively. In an SS/PBCH burst set, all SSBs may be transmitted in a 5 ms time window, and may be repeatedly transmitted according to a certain period. The period may be configured through an upper-layer parameter SSB-timing, including 5 ms, 10 ms, 20 ms, 40 ms, 80 ms and 160 ms, etc. No specific limits are made in the embodiment of the disclosure.

Figure 3:
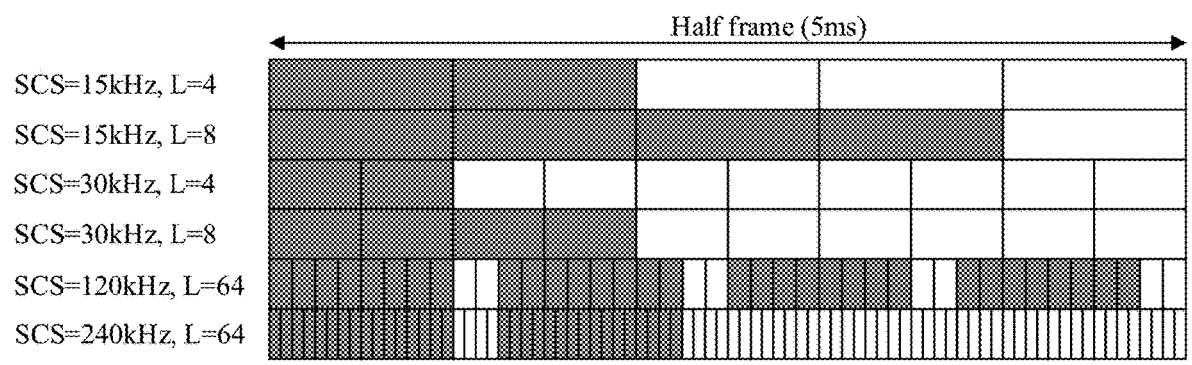
FIG. 3 is a slot distribution diagram of SSB according to an embodiment of the disclosure.

Referring to FIG. 3, a slot distribution diagram of SSB according to an embodiment of the disclosure is shown. FIG. 3 includes six slot distributions corresponding to different SCSs and different SSB numbers L. For example, in case of SCS=15 kHz and L=4, a slot includes 14 symbols and may bear two SSBs. That is, in a 5 ms time window shown in FIG. 3, four SSBs are distributed in first two slots.

For ensuring friendly coexistence of each communication system using unlicensed spectrums for wireless communication in the spectrums, some countries or districts set regulatory requirements for use of the unlicensed spectrums. For example, in the Europe, a communication device follows a Listen-Before-Talk (LBT) principle, namely a communication device, before transmitting a signal in a channel of an unlicensed spectrum, is required to listen the channel first. The communication device can send a signal only when a channel listening result is that the channel is idle. When the channel listening result obtained by the communication device with regard to the channel of the unlicensed spectrum is that the channel is busy, the communication device cannot send the signal. For ensuring fairness, in a signal transmission process, a time length for signal transmission of the communication device using the channel of the unlicensed spectrum cannot exceed Maximum Channel Occupation Time (MCOT). However, when an NR technology is adopted for data transmission in an unlicensed spectrum, SSB cannot be successfully transmitted at SSB transmission time defined in present NR in SSB transmitting process due to the probability of an LBT failure. An existing solution is to increase transmission opportunities of SSB and define new SSB transmission time as an alternative. In such a manner, when the SSB cannot be transmitted at certain transmission time due to LBT failure, the SSB can be transmitted at alternative transmission time.

Figure 4:
FIG. 4 is a schematic diagram of increasing transmission opportunities according to an embodiment of the disclosure.
Figure 4:
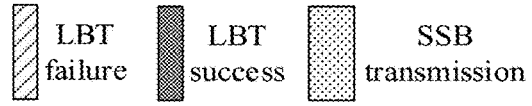

Referring to FIG. 4, a schematic diagram of increasing transmission opportunities according to an embodiment of the disclosure. As shown in FIG. 4, when LBT executed before transmission time of SSB index 0 fails, channel listening is needed to be continued. When LBT executed before SSB index 2 succeeds, residual SSBs may be started to be transmitted from the SSB index 2. After SSB index 7 is transmitted, the SSB index 0 and SSB index 1 that are not successfully transmitted before may be transmitted. Practical transmission time of the SSB index 0 and the SSB index 1 may be alternative transmission time. In such case, according to time when LBT succeeds, practical transmission time of SSB may be target transmission time (for example, predefined transmission time) or may also be alternative transmission time.

In principle, increasing more transmission opportunities of SSB is more favorable for successfully transmitting the SSB. However, a length of a transmission window of the SSB may also be increased at the same time of increasing the transmission opportunities of the SSB. Since a terminal device measures SSB according to a preconfigured window (for example, SSB Measurement Timing Configuration (SMTC) window), if a length of a transmission window of the SSB is increased, for measuring transmitting positions of the SSB, a relatively large SMTC window is needed to be configured, which may bring negative impact to measurement of the terminal, for example, power conservation and a transmission interruption time length of inter-frequency measurement. In the embodiment of the disclosure, for increasing listening opportunities of SSB as much as possible and simultaneously reducing impact on measurement of a terminal, each embodiment of the disclosure will be described below in combination with the drawings in detail.

Embodiment 1

Figure 5:
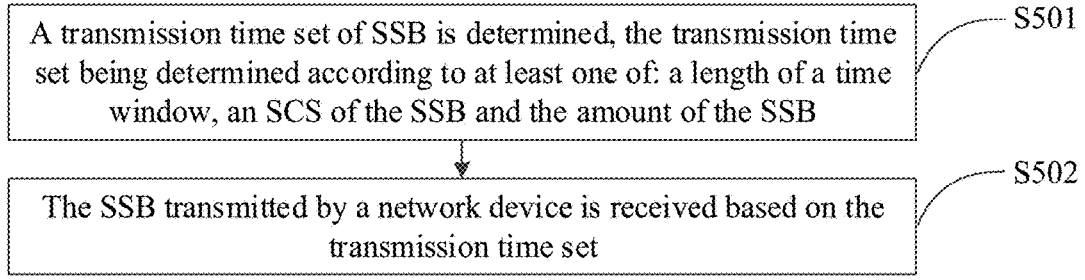
FIG. 5 is a flowchart of a signal transmission method according to an embodiment of the disclosure.

Referring to FIG. 5, a flow of a signal transmission method provided in the embodiments of the disclosure is shown. The method may be implemented by a terminal device in the abovementioned communication system. The method may include the following operations.

In S501, a transmission time set of SSB is determined, the transmission time set being determined according to at least one of: a length of a time window, an SCS of the SSB and the amount of the SSB.

In S502, the SSB transmitted by a network device is received based on the transmission time set.

The technical solution shown in FIG. 5 is implemented by a terminal device. A transmission time set of SSB may be determined, the transmission time set being determined according to at least one of: a length of a time window, an SCS of the SSB and the amount of the SSB. The SSB transmitted by the network device may be received based on the transmission time set. Since the impact of parameters such as the length of a time window, an SCS of the SSB and the amount of the SSB is also considered when a transmission opportunity of the SSB is determined, transmission opportunities of the SSB can be increased as much as possible, and meanwhile, impact on measurement of the terminal can also be reduced.

It can be understood that a transmission time set of SSB may be determined according to parameter information such as a length of a time window, an SCS of the SSB and the amount of the SSB. Herein, the transmission time set represents all possible transmission time at which the SSB can be transmitted. Therefore, for the technical solution shown in FIG. 5, in a possible implementation mode, the transmission time set may include at least one first transmission time and a second transmission time. The second transmission time represents target transmission time. The at least one first transmission time represents alternative transmission time other than the second transmission time.

In the implementation mode, the operation that the transmission time set of the SSB is determined may specifically include that:

the at least one first transmission time within the time window is acquired according to the SCS of the SSB and the amount of the SSB; and the transmission time set of the SSB is determined according to the at least one first transmission time.

It is to be noted that there may be multiple pieces of first transmission time, which are obtained based on transmission opportunities additionally increased for the terminal device. For ensuring that SSB can be successfully transmitted, more transmission opportunities need to be obtained as much as possible, for example, acquiring a maximum amount of first transmission time. The transmission time may also be called alternative transmission time. There is only one piece of second transmission time, which is obtained according to transmission time predefined for the terminal device. The second transmission time may also be called the target transmission time.

In the embodiment of the disclosure, if there is more first transmission time, it is indicated that there are more transmission opportunities of SSB. For successfully transmitting the SSB, there may be many transmission opportunities for the terminal device. The transmission time corresponding to all these possible transmission opportunities form the transmission time set. These transmission opportunities are not randomly determined, and are mainly related to the parameter information such as the length of the time window, the SCS of the SSB and the amount of the SSB. After the transmission time set is determined, the terminal device may receive the SSB from the network device. Herein, practical transmission time of the SSB may be the target transmission time or may also be one or more pieces of alternative transmission time. Specifically, the practical transmission time of the SSB may be obtained by the network device according to a practical condition of channel listening and channel preemption. No specific limits are made thereto in the embodiment of the disclosure.

The slot distribution of SSB shown in FIG. 3 is taken as an example. Under different SCSs and L values, slot distributions of the SSB in a 5 ms time window are different. There is made such a hypothesis that the time window (for example, an SMTC window) is set to be 5 ms, and in this SMTC window, transmission opportunities of the SSB need to be increased. The transmission opportunities, obtained according to different parameter information such as different sizes of the SMTC window, SCSs and L, of the SSB are different. The transmission time corresponding to all these possible transmission opportunities of the SSB forms a transmission time set.

Figure 6:
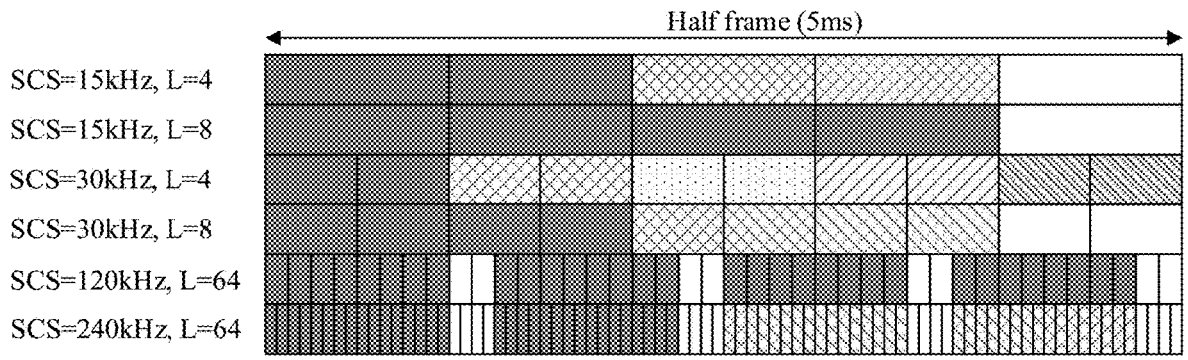
FIG. 6 is a distribution diagram of transmission opportunities increased based on different parameter information according to an embodiment of the disclosure.

Referring to FIG. 6, a distribution diagram of transmission opportunities increased based on different parameter information according to an embodiment of the disclosure is shown. In FIG. 6, the time window (for example, a SMTC window) is still set to be, for example, 5 ms. Within this SMTC window, for different parameter information such as different SCSs and L, transmission opportunities determined for the SSB are different. Transmission time corresponding to the grey filled pattern is predefined transmission time, i.e., the second transmission time. Transmission time corresponding to other filled patterns than the grey filled pattern is alternative transmission time, i.e., the first transmission time. In addition, all the other filled patterns are adopted to represent the transmission opportunities increased for the SSB. If there are more types of filled patterns, it is indicated that more transmission opportunities are increased for the SSB. For example, under configuration information that is SCS=30 kHz and L=4, four transmission opportunities may be increased for the SSB. Under configuration information that is SCS=15 kHz and L=8, no transmission opportunity is increased for the SSB. Under configuration information that is SCS=240 kHz and L=64, one transmission opportunity is increased for the SSB.

For the technical solution shown in FIG. 5, in a possible implementation mode, the time window may be a predefined time window or a measurement time window configured by the network device.

In the solution, after the operation that the SSB transmitted by the network device is received based on the transmission time set, the method may specifically further include that:

when the time window is the measurement time window, signal measurement is performed on the SSB.

It is to be noted that, in the embodiments of the disclosure, the time window may be the predefined window or may also be the measurement time window configured by the network device. The length of the time window may specifically be set to be, for example, 5 ms, 8 ms or 10 ms according to a practical requirement. No specific limits are made thereto in the embodiment of the disclosure.

For example, as shown in FIG. 6, the length of the time window is 5 ms, i.e., a time length of a half frame. In FIG. 6, all the transmission opportunities increased for the SSB are within the 5 ms time window and no larger time window is configured, so that signal measurement of the terminal device over the SSB can still be implemented within the 5 ms time window, and negative impact on measurement of the terminal is avoided.

For the technical solution shown in FIG. 5, in a possible implementation mode, the amount of the SSB may be a predefined amount of the SSB or an amount of the SSB that is actually transmitted.

It is to be noted that the maximum amount of the SSB is related to a band of a system. For example, when the band of the system does not exceed 3 GHz, the maximum number L of SS/PBCH blocks is valued to be 4. When the band of the system ranges from 3 GHz to 6 GHz, the maximum number L of the SS/PBCH blocks is valued to be 8. When the band of the system ranges from 6 GHz to 52.6 GHz, the maximum number L of the SS/PBCH blocks is valued to be 64. Herein, the amount of the SSB may be the predefined amount of the SSB or may also be the amount of the SSB that is actually transmitted. No specific limits are made thereto in the embodiment of the disclosure. FIG. 6 is still taken as an example. In FIG. 6, a value of the amount L of the SSB may be 4, or may also be 8 or may also be 64. For different values of L, transmission opportunities correspondingly increased for the SSB under different parameter information such as different L and SCSs are shown in FIG. 6.

For the technical solution shown in FIG. 5, in a possible implementation mode, the SCS of the SSB may be a predefined SCS or an SCS configured by the network device.

It is to be noted that, in the communication system, there is usually one or more configurations for an SCS of the SSB, for example, 15 kHz, 30 kHz, 120 kHz and 240 kHz. Specifically, the SCS may be predefined or may also be configured by a network device. The SCS may also be indicated by the network device through signaling, or may even be determined according to an SCS of a physical random access channel. No specific limits are made thereto in the embodiment of the disclosure.

For example, in FIG. 6, the length of the time window is still 5 ms. According to different configuration information, the probability of successfully transmitting the SSB can be increased. For example, in case of SCS=30 kHz and L=4, four transmission opportunities may be increased for the SSB. In case of SCS=15 kHz and L=4, one transmission opportunity may be increased for the SSB. Since all the transmission opportunities increased for the SSB are within the 5 ms time window and no larger time window is configured, negative impact on measurement of the terminal can be avoided. In the embodiments of the disclosure, since the impact of the parameters such as the length of the time window, the SCS of the SSB and the amount of the SSB is also considered when the transmission opportunity of the SSB is determined, the transmission opportunities of the SSB can be increased as much as possible, and meanwhile, the impact on the measurement of the terminal can also be reduced.

The embodiment provides the signal transmission method. A transmission time set of SSB can be determined, the transmission time set being determined according to at least one of: a length of a time window, a SCS of the SSB and the amount of the SSB. The SSB transmitted by a network device can be received based on the transmission time set. Therefore, the transmission opportunities of the SSB can be increased as much as possible, and meanwhile, the impact on measurement of the terminal can also be reduced.

Embodiment 2

Figure 7:
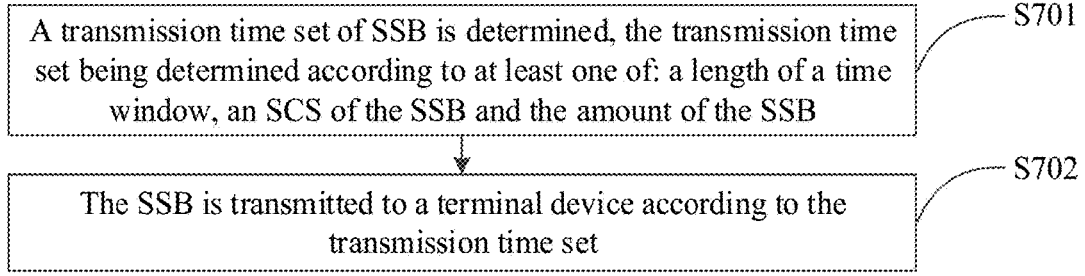
FIG. 7 is a flowchart of another signal transmission method according to an embodiment of the disclosure.

Based on the same inventive concept of the abovementioned embodiment, referring to FIG. 7, a flow of another signal transmission method provided in the embodiment of the disclosure is shown. The method may be implemented by the network device shown in FIG. 1. The method may include the following operations.

In S701, a transmission time set of SSB is determined, the transmission time set being determined according to at least one of: a length of a time window, an SCS of the SSB and the amount of the SSB.

In S702, the SSB is transmitted to a terminal device according to the transmission time set.

The technical solution shown in FIG. 7 is implemented by the network device. A transmission time set of SSB can be determined, the transmission time set being determined according to at least one of: a length of a time window, a SCS of the SSB and the amount of the SSB, and the SSB can be transmitted to the terminal device according to the transmission time set. Since impact of parameters such as the length of the time window, the SCS of the SSB and the amount of the SSB is also considered when a transmission opportunity of the SSB is determined, transmission opportunities of the SSB can be increased as much as possible, and meanwhile, impact on measurement of the terminal can also be reduced.

For the technical solution shown in FIG. 7, in a possible implementation mode, the transmission time set may include at least one first transmission time and a second transmission time. The second transmission time represents target transmission time, and the at least one first transmission time represents alternative transmission time other than the second transmission time.

In the implementation mode, the operation that the transmission time set of the SSB is determined may specifically include that:

the at least one first transmission time within the time window is acquired according to the SCS of the SSB and the amount of the SSB; and the transmission time set of the SSB is determined according to the at least one first transmission time.

It is to be noted that, after the transmission time set is determined, the network device may send the SSB to the terminal device by channel listening or channel preemption. Practical transmission time of the SSB may be obtained by the network device according to a practical condition of channel listening and channel preemption. Herein, the practical transmission time may be the target transmission time or may also be one or more pieces of alternative transmission time. No specific limits are made thereto in the embodiment of the disclosure.

For the technical solution shown in FIG. 7, in a possible implementation mode, the time window may be a predefined time window or a measurement time window configured by the network device.

In the implementation mode, after the operation that the SSB is transmitted to the terminal device based on the transmission time set, the method may specifically further include that:

when the time window is the measurement time window, a signal measurement result of the SSB is received from the terminal device.

It is to be noted that the time window may be the predefined window or may also be the measurement time window configured by the network device. No specific limits are made in the embodiment of the disclosure. There is made such a hypothesis that, when the time window is the measurement time window, the terminal device may perform signal measurement on the SSB and the network device may receive the signal measurement result from the terminal device.

The embodiment provides the signal transmission method. A transmission time set of SSB can be determined, the transmission time set being determined according to at least one of: a length of a time window, a SCS of the SSB and the amount of the SSB. The SSB can be transmitted to the terminal device based on the transmission time set. Therefore, the transmission opportunities of the SSB can be increased as much as possible, and meanwhile, the impact on measurement of the terminal can also be reduced.

Embodiment 3

Figure 8:
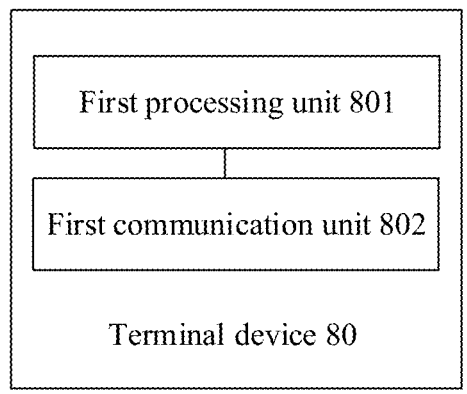
FIG. 8 is a composition diagram of a terminal device according to an embodiment of the disclosure.

Based on the same inventive concept of the abovementioned embodiments, referring to FIG. 8, a composition of a terminal device 80 provided in the embodiment of the disclosure is shown. The terminal device 80 includes a first processing unit 801 and a first communication unit 802.

The first processing unit 801 is configured to determine a transmission time set of SSB, the transmission time set being determined according to at least one of: a length of a time window, an SCS of the SSB and the amount of the SSB.

The first communication unit 802 is configured to receive the SSB from a network device based on the transmission time set.

In the solution, the transmission time set may include at least one first transmission time and a second transmission time. The second transmission time represents target transmission time. The at least one first transmission time represents alternative transmission time other than the second transmission time.

In the solution, the first processing unit 801 is configured to acquire the at least one first transmission time within the time window according to the SCS of the SSB and the amount of the SSB and determine the transmission time set of the SSB according to the at least one first transmission time.

In the solution, the time window may be a predefined time window or a measurement time window configured by the network device.

In the solution, the first processing unit 801 is further configured to, when the time window is the measurement time window, perform signal measurement on the SSB.

In the solution, the amount of the SSB may be a predefined amount of the SSB or the amount of the SSB that is actually transmitted.

In the solution, the SCS of the SSB may be a predefined SCS or an SCS configured by the network device.

It can be understood that, in the embodiment, "unit" may be part of a circuit, part of a processor, part of a program or software and the like, of course, may also be modular and may also be non-modular.

In addition, each unit in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the above embodiment. The storage medium includes: various media capable of storing program codes such as a U disk, a mobile hard disk, a Read-Only Memory (ROM), a Random Access Memory (RAM), a magnetic disk or an optical disk.

Therefore, an embodiment provides a computer storage medium, which stores a signal transmission program, the signal transmission program being executed by at least one processor to implement the operations of the method in embodiment 1.

Figure 9:
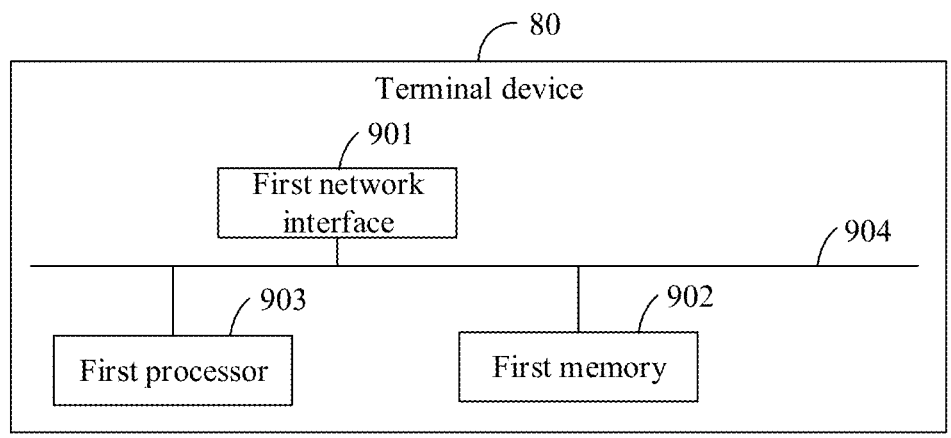
FIG. 9 is a specific hardware structure diagram of a terminal device according to an embodiment of the disclosure.

Based on the terminal device 80 and the computer storage medium, referring to FIG. 9, a specific hardware structure of the terminal device 80 provided in the embodiment of the disclosure is shown, and includes a first network interface 901, a first memory 902 and a first processor 903. Each component is coupled together through a bus system 904. It can be understood that the bus system 904 is configured to implement connection communication between these components. The bus system 904 includes a data bus and further includes a power bus, a control bus and a state signal bus. However, for clear description, various buses in FIG. 9 are marked as the bus system 904. The first network interface 901 is configured to receive and send a signal in a process of receiving and transmitting information with another external network element.

The first memory 902 is configured to store a computer program capable of running in the first processor 903.

The first processor 903 is configured to run the computer program to implement operations of:

determining a transmission time set of SSB, the transmission time set being determined according to at least one of a length of a time window, an SCS of the SSB and the amount of the SSB; and receiving the SSB from a network device is received based on the transmission time set.

It can be understood that the first memory 902 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synch-link DRAM (SLDRAM) and a Direct Rambus RAM (DRRAM). It is to be noted that the first memory 902 of a system and method described in the disclosure is intended to include, but not limited to, memories of these and any other proper types.

The first processor 903 may be an integrated circuit chip with a signal processing capability. In an implementation process, each operation of the method may be completed by an integrated logic circuit of hardware in the first processor 903 or an instruction in a software form. The first processor 903 may be a universal processor, a Digital Signal Processor (DSP), an Application Specific Integrated Circuit (ASIC), a Field-Programmable Gate Array (FPGA) or another Programmable Logic Device (PLD), discrete gate or transistor logical device and discrete hardware component. Each method, operation and logical block diagram described in the embodiments of the disclosure may be implemented or executed. The universal processor may be a microprocessor or the processor may also be any conventional processor and the like. The operations of the method described in combination with the embodiment of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the first memory 902. The first processor 903 reads information in the first memory 902 and completes the operations of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the disclosure or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Specifically, the first processor 903 in the terminal device 80 is further configured to run the computer program to execute the operations of the method in embodiment 1. Elaborations are omitted herein.

Embodiment 4

Figure 10:
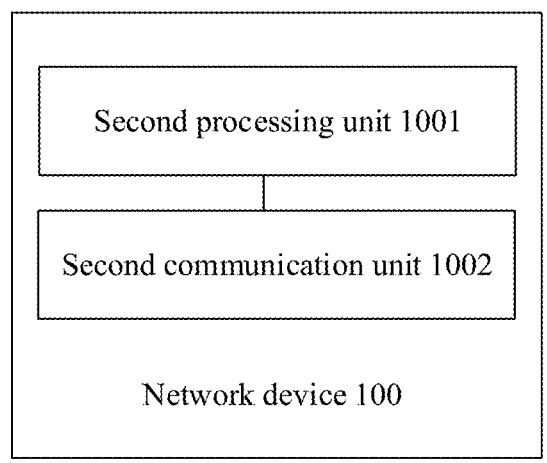
FIG. 10 is a composition diagram of a network device according to an embodiment of the disclosure.

Based on the same inventive concept of the abovementioned embodiments, referring to FIG. 10, a composition of a network device 100 provided in the embodiment of the disclosure is shown. The network device 100 includes a second processing unit 1001 and a second communication unit 1002.

The second processing unit 1001 is configured to determine a transmission time set of SSB, the transmission time set being determined according to at least one of: a length of a time window, an SCS of the SSB and the amount of the SSB.

The second communication unit 1002 is configured to send the SSB to a terminal device based on the transmission time set.

In the solution, the transmission time set may include at least one first transmission time and a second transmission time. The second transmission time represents target transmission time. The at least one first transmission time represents alternative transmission time other than the second transmission time.

In the solution, the second processing unit 1001 is configured to acquire the at least one first transmission time within the time window according to the SCS of the SSB and the amount of the SSB and determine the transmission time set of the SSB according to the at least one first transmission time.

In the solution, the time window may be a predefined time window or a measurement time window configured by the network device.

In the solution, the second processing unit 1002 is further configured to, when the time window is the measurement time window, receive a signal measurement result of the SSB from the terminal device.

In the solution, the amount of the SSB may be a predefined amount of the SSB or the amount of the SSB that is actually transmitted.

In the solution, the SCS of the SSB may be a predefined SCS or an SCS configured by the network device.

In addition, an embodiment provides a computer storage medium, which stores a signal transmission program, the signal transmission program being executed by at least one processor to implement the operations of the method in embodiment 2. Specific elaborations about the computer storage medium refer to the descriptions in the abovementioned technical solution and are omitted herein.

Figure 11:
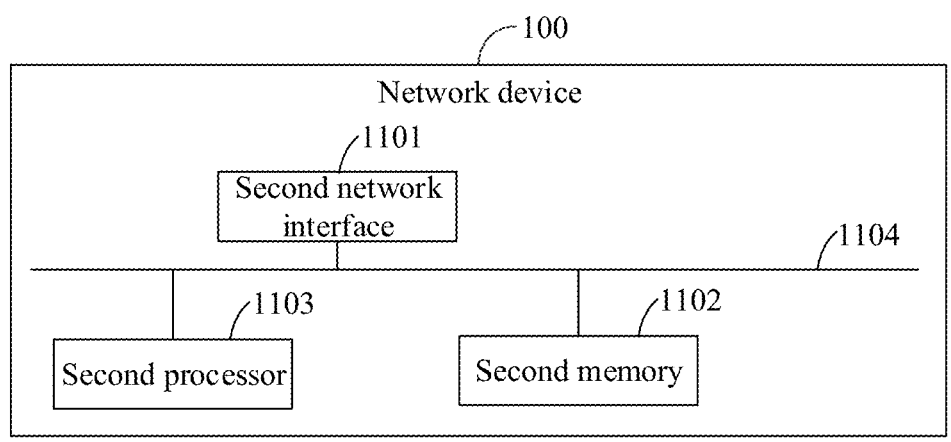
FIG. 11 is a specific hardware structure diagram of a network device according to an embodiment of the disclosure.

Based on the network device 100 and the computer storage medium, referring to FIG. 11, a specific hardware composition of the network device 100 provided in the embodiment of the disclosure is shown, which includes a second network interface 1101, a second memory 1102 and a second processor 1103. Each component is coupled together through a bus system 1104. It can be understood that the bus system 1104 is configured to implement connection communication between these components. The bus system 1104 includes a data bus and further includes a power bus, a control bus and a state signal bus. However, for clear description, various buses in FIG. 11 are marked as the bus system 1104. Herein, The second network interface 1101 is configured to receive and send a signal in a process of receiving and transmitting information from and to another external network element.

The second memory 1102 is configured to store a computer program capable of running in the second processor 1103.

The second processor 1103 is configured to run the computer program to implement operations of:

determining a transmission time set of SSB, the transmission time set being determined according to at least one of; a length of a time window, an SCS of the SSB and the amount of the SSB; and transmitting the SSB to a terminal device based on the transmission time set.

It can be understood that parts in the specific hardware structure of the network device 100 in the embodiment are similar to the corresponding parts in embodiment 3 and will not be elaborated herein.

Specifically, the second processor 1103 in the network device 100 is further configured to run the computer program to implement the operations of the method in embodiment 2. Elaborations are omitted herein.

It is to be noted that the technical solutions recorded in the embodiments of the disclosure may be freely combined without conflicts.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for signal transmission, implemented by a terminal device, the method comprising:

determining a transmission time set of one or more Synchronization Signal Block (SSBs), wherein the transmission time set is determined according to a length of a time window and a Subcarrier Spacing (SCS) of the one or more SSBs, and the time window is configured for transmission of the one or more SSBs, and wherein the time window includes a half-frame having multiple slots; and receiving the one or more SSBs from a network device based on the transmission time set, wherein each slot in the half-frame comprises a transmission opportunity for two SSBs.

2. The method of claim 1, wherein the transmission time set comprises all possible transmission time at which the one or more SSBs can be transmitted.

3. The method of claim 1, wherein the transmission time set is formed by transmission time corresponding to all possible transmission opportunities for the one or more SSBs.

4. The method of claim 3, wherein the transmission time set is formed by transmission time corresponding to all possible transmission opportunities for the one or more SSBs in the time window.

5. The method of claim 4, wherein the time window is a predefined time window or a measurement time window configured by the network device.

6. The method of claim 5, wherein the length of the time window is a half frame and the half frame is 5 ms; and the method for signal transmission is applied to unlicensed spectrums.

7. The method of claim 1, wherein
when the SCS of the one or more SSBs is a first SCS, a maximum amount of the one or more SSBs is first maximum amount L1;
when the SCS of the one or more SSBs is a second SCS, a maximum amount of the one or more SSBs is second maximum amount L2;
wherein the first SCS is not equal to the second SCS and the L1 is not equal to the L2.

8. The method of claim 7, wherein the time window is a measurement time window.

9. The method of claim 1, wherein the SCS of the one or more SSBs is a predefined SCS or an SCS configured by the network device.

10. A terminal device, comprising a first processor and a first network interface, wherein
the first processor is configured to determine a transmission time set of one or more Synchronization Signal Blocks (SSBs), the transmission time set being determined according to a length of a time window and a Subcarrier Spacing (SCS) of the one or more SSBs, and the time window being configured for transmission of the one or more SSBs, and wherein the time window includes a half-frame having multiple slots; and
the first network interface is configured to receive the one or more SSBs from a network device based on the transmission time set, wherein each slot in the half-frame comprises a transmission opportunity for two SSBs.

11. The terminal device of claim 10, wherein the transmission time set comprises all possible transmission time at which the one or more SSBs can be transmitted.

12. The terminal device of claim 10, wherein the transmission time set is formed by transmission time corresponding to all possible transmission opportunities for the one or more SSBs.

13. The terminal device of claim 12, wherein the transmission time set is formed by transmission time corresponding to all possible transmission opportunities for the one or more SSBs in the time window.

14. The terminal device of claim 13, wherein the time window is a predefined time window or a measurement time window configured by the network device.

15. The terminal device of claim 14, wherein length of the time window is a half frame and the half frame is 5 ms; and the method for signal transmission is applied to unlicensed spectrums.

16. The terminal device of claim 10, wherein
when the SCS of the one or more SSBs is a first SCS, a maximum amount of the one or more SSBs is first maximum amount L1;
when the SCS of the one or more SSBs is a second SCS, a maximum amount of the one or more SSBs is second maximum amount L2;
wherein the first SCS is not equal to the second SCS and the L1 is not equal to the L2.

* * * * *